Dec. 28, 1954   M. H. BRADEN ET AL   2,698,391
ENGINE CONTROL SYSTEM
Filed May 2, 1952   4 Sheets-Sheet 3
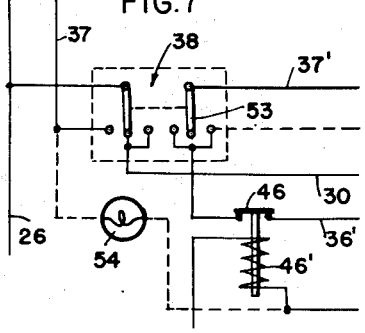
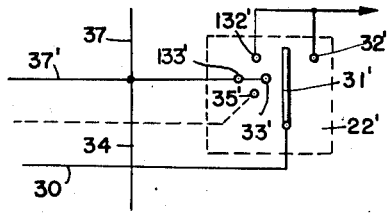
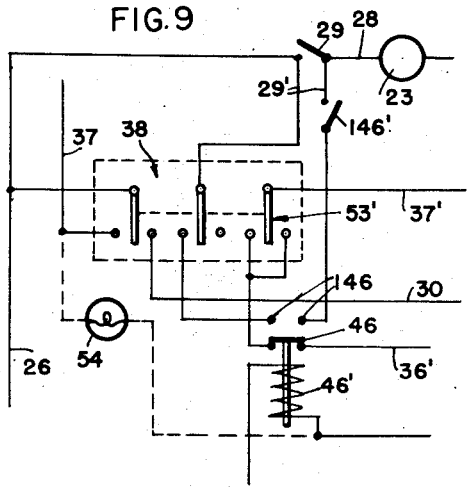
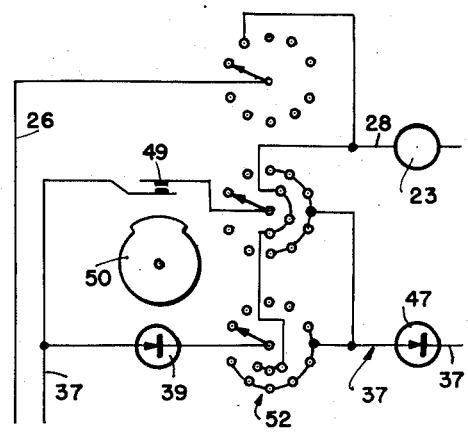
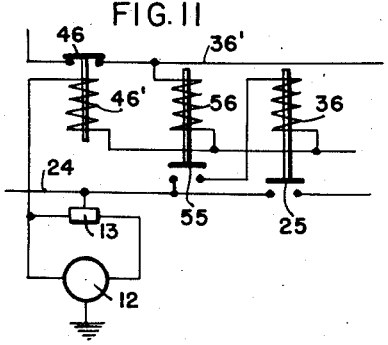
INVENTORS:—
MARSHALL H. BRADEN
EVERETT A. STAPLETON
BY:—
Spencer, Johnston Cook & Root
ATTORNEYS Dec. 28, 1954   M. H. BRADEN ET AL   2,698,391
ENGINE CONTROL SYSTEM
Filed May 2, 1952   4 Sheets-Sheet 4
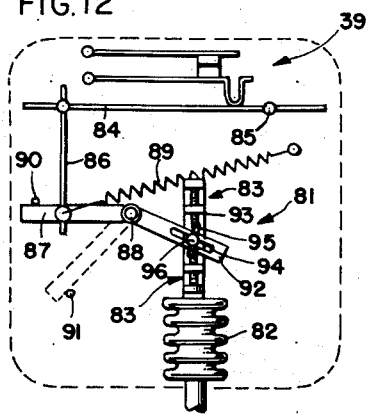
FIG. 12
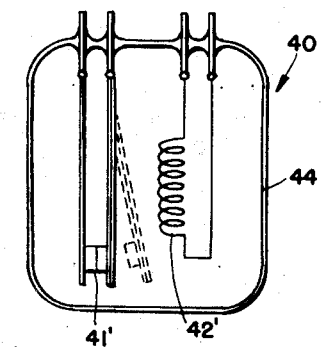
FIG. 15
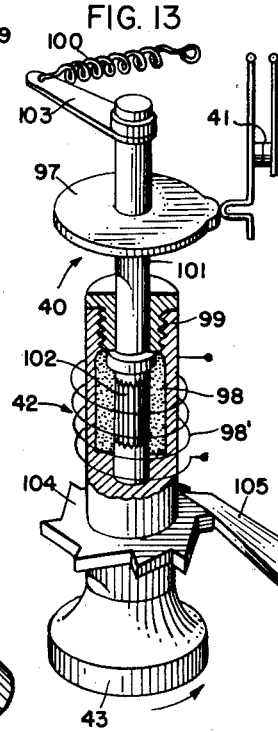
FIG. 13
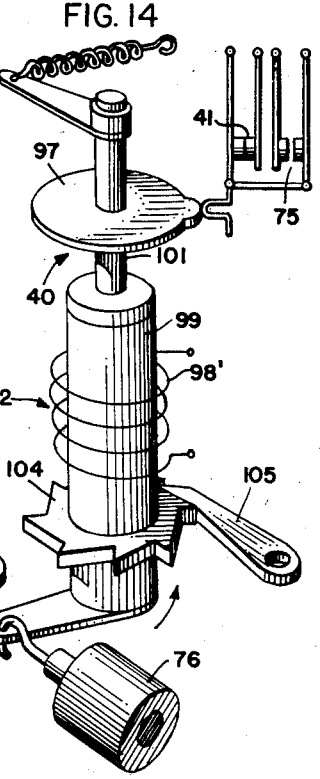
FIG. 14
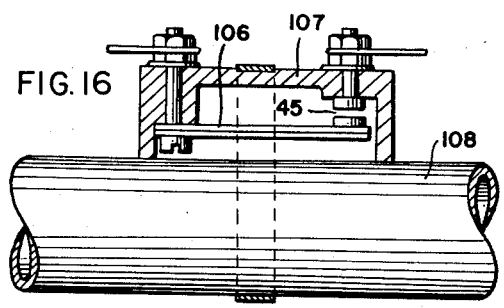
FIG. 16
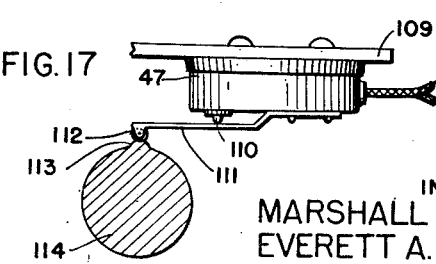
FIG. 17
FIG. 18
INVENTORS:—
MARSHALL H. BRADEN
EVERETT A. STAPLETON
BY:—
Marzall, Johnston, Cook & Root
ATT'YS

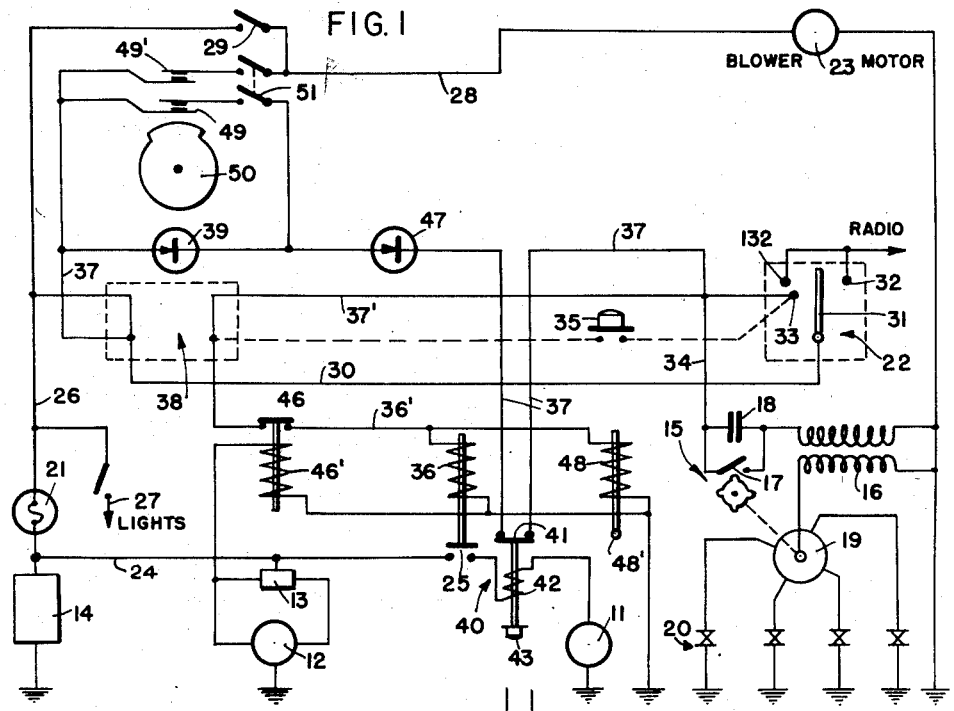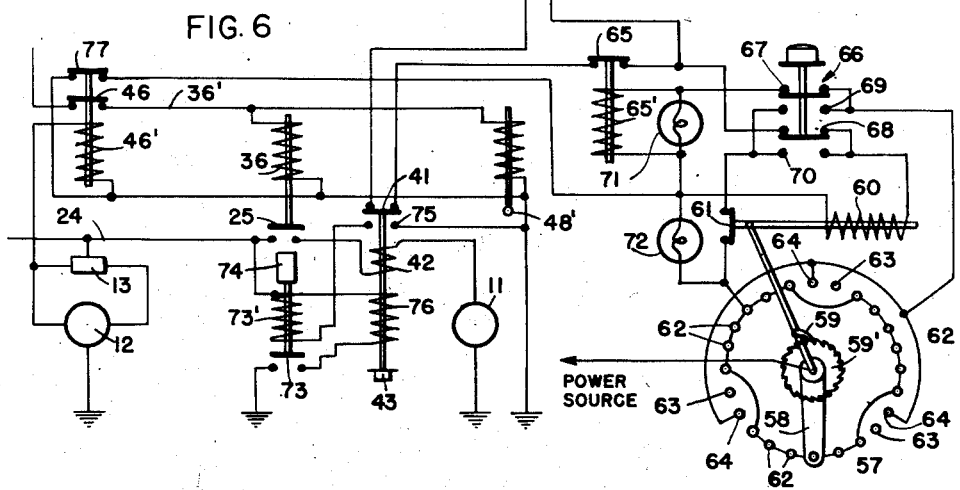

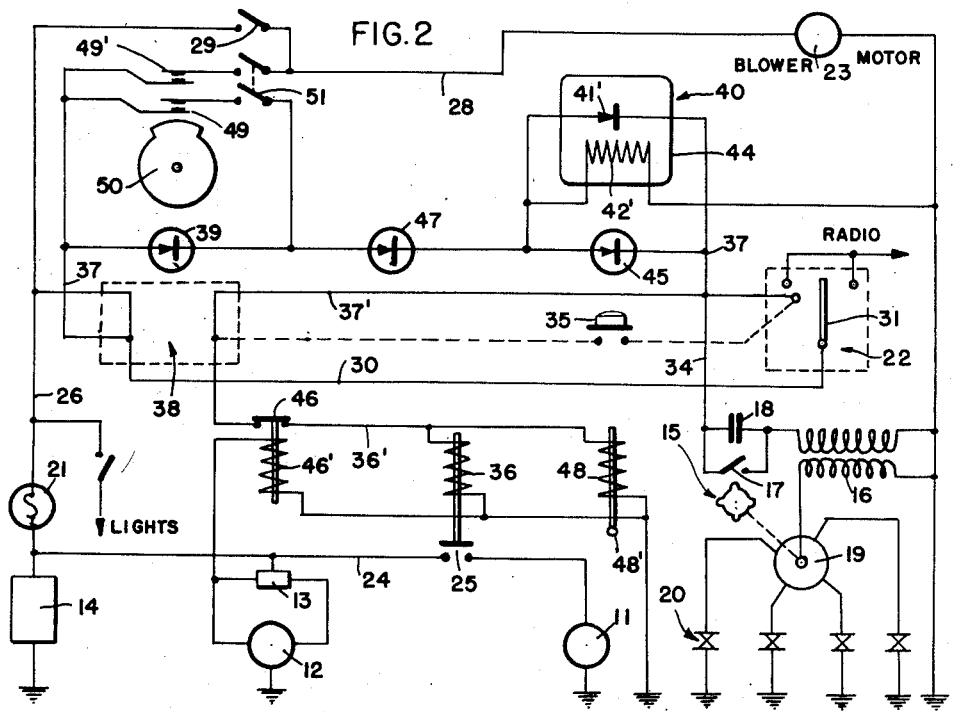

UNITED STATES PATENT OFFICE 2,698,391
Patented Dec. 28, 1954

2,698,391

ENGINE CONTROL SYSTEM

Marshall H. Braden, Lake Calhoun, Lafayette, and Everett A. Stapleton, Rock Island, Ill.

Application May 2, 1952, Serial No. 285,706

19 Claims. (Cl. 290—2)

The present invention relates in general to the control of internal combustion engines and has more particular reference to the control of engines employed for the motivation of vehicles.

An important object of the invention is to provide an improved control system adapted automatically to start and stop an internal combustion engine; a further object being to provide for starting and stopping an engine in accordance with prevailing temperature conditions; a still further object being to provide for starting the engine when the same reaches a predetermined, or selectively predeterminable, low temperature, in order that the operation of the engine may prevent the same from freezing up or becoming otherwise damaged under low temperature conditions; yet a further object being to provide for stopping the operation of an engine, so automatically started, when the temperature thereof reaches a predetermined, or selectively predeterminable, high temperature.

Another important object is to provide means whereby an engine may be started and stopped automatically under the control of clock mechanism; a further object being to provide selectively operable means whereby an engine may be automatically started and stopped either in accordance with temperature, or at timed intervals regardless of temperature, or both.

Another important object is to provide mechanism for automatically controlling the ignition of an internal combustion engine, as well as means for cranking the same for starting purposes whereby the engine may be started in operation and stopped either at periodic intervals or in response to temperature conditions prevailing in the engine.

Another important object of the invention is to provide means for disabling the engine starting equipment, in the event that the engine fails to start after a predetermined period of cranking, in order to prevent the unnecessary expenditure of cranking energy on an engine, which, for any reason, refuses to start, after a predetermined cranking intervals; a further object being to provide means whereby, after failure of the engine to start as a result of a starting attempt, a desired number of successive engine starting efforts of desired duration will be attempted automatically, each after a rest interval of predetermined duration, until the engine does start; a still further object being to provide for the disablement of the engine starting equipment in the event that the engine should fail to start after the performance of a predetermined number of starting attempts.

Another important object resides in the provision of means for preventing operation of the engine starting equipment while the engine is drivingly connected with its load, the same being particularly desirable where apparatus embodying the present invention is applied to the control of engines forming the power plant of automotive vehicles, in which, as a safety factor, the engine should not be started if drivingly connected with its load comprising the wheels of the vehicles.

Another important aspect of the invention resides in the ability of apparatus embodying the same, when applied to the control of automotive vehicle engines, automatically to restart the same in the event that the engine during normal operation of the vehicle should stall, apparatus incorporating the present invention being adapted, after an engine stall, to automatically crank the same upon release of the clutch connection between the engine and its load.

The foregoing and numerous other important objects, advantages and inherent functions of the invention will become apparent as the same is more fully understood from the following description, which, taken in connection with the accompanying drawings, discloses preferred embodiments of the invention.

Referring to the drawings:

Figures 1 and 2 are schematic diagrams of engine control systems embodying the present invention;

Figures 3 and 4 are schematic diagrams of portions of the systems shown in Figures 1 and 2 in order to illustrate additional facilities that may be incorporated therein;

Figures 5 and 6 are schematic diagrams illustrating equipment which may be provided respectively in the systems shown in either Figures 1 or 2 to enable the apparatus to perform more than one engine starting cycle before becoming disabled;

Figures 7 and 9 are schematic diagrams illustrating selector switches which may be incorporated in the equipment shown in the preceding figures.

Figure 8 is a schematic diagram of a control switch which may be employed in systems embodying the present invention.

Figure 10 is a schematic diagram illustrating selector switch means which may be incorporated in the equipment shown in Figures 1 and 2.

Figure 11 is a schematic diagram illustrating a modified circuit arrangement embodying an additional relay switch which may be incorporated in the equipment shown in the preceding figures.

Figure 12 is a diagrammatic representation of conventional temperature responsive switch means which may be employed as a component in systems embodying the present invention.

Figure 13 is a diagrammatic representation of conventional delayed action circuit breaking switch means which may be employed as a component in systems embodying the present invention.

Figure 14 is a perspective view showing a modified arrangement of portions of the switch means depicted in Figure 13.

Figure 15 is a diagrammatic representation of conventional delayed action circuit breaking switch means which may be employed as a component in systems embodying the present invention.

Figure 16 is a diagrammatic representation of conventional temperature responsive switch means which may be employed as a component in systems embodying the present invention.

Figure 17 is a diagrammatic representation of a cam actuated safety switch which may be employed as a component in systems embodying the present invention.

Figure 18 is a diagrammatic representation of a cam actuated timer switch which may be employed as a component in systems embodying the present invention.

To illustrate the invention, Figures 1 and 2 of the drawings illustrate electrical equipment that may be applied to automatically control the starting and stopping of internal combustion engines, particularly engines employed for motivating automotive vehicles. In this connection, the equipment as shown in Figures 1 and 2 may include an electrical engine-starting motor 11, a generator 12 and its cutout relay 13, a power source 14, which may comprise a storage battery, and engine ignition means 15. While the invention is not necessarily restricted to any particular kind of ignition means 15, the same as shown may comprise a step-up transformer 16, a make and break switch 17 and associated condenser 18 and a distributor 19 for applying ignition energy to the engine firing elements which, as shown, may comprise spark plugs 20.

The apparatus shown in Figures 1 and 2 may also include a fuse 21 or other circuit protection device, a circuit control switch 22, which may comprise the conventional key controlled ignition switch usually provided in automotive vehicles, and a fan driving motor 23 which may be of the sort commonly provided in automotive vehicles for the circulation of engine heated air in the passenger space of the vehicle.

The starter motor 11, generator 12, the power source 14, the fan motor 23 and the spark plugs 20 may be grounded, each on one side, as on the frame of the vehicle in which installed. The ungrounded or high side of the power source 14 may be connected as by means of the conductor 24 to the generator 12 through the cut-out relay 13, and with the engine starting motor 11 through a normally open starting switch 25; and the motor 11 consequently may be energized by the power source 14 to crank the engine for starting purposes upon closure of the switch 25. The function and purpose of the conventional cutout switch 13 is, of course, to disconnect the generator 12 from the conductor 24 until the generator is being driven by the engine at speed sufficient to enable the generator to deliver electrical power to the conductor 24 at a voltage in excess of that provided by the power source 14.

The high side of the power source 14 also may be connected through the fuse or circuit protection device 21 with a bus conductor 26, through which electrical power may be supplied for the operation of the ignition means 15, the fan motor 23, various utilities such as vehicle lights, a clock, and a radio, as well as other hereinafter described components of the control system. To this end, a switch controlled circuit 27, connected with the bus conductor 26, may be provided for energizing utilities such as vehicle lights. Another circuit in connection with the bus conductor 26 may be provided to energize a vehicle clock. A circuit 28 connected with the conductor 26 and controlled by a switch 29 may be provided to control the operation of the fan motor 23. Likewise, a circuit comprising a conductor 30 connected with the bus conductor 26 may be provided for supplying electrical power for the operation of the ignition means 15, as well as for the control of the switch 25, through the control switch 22.

To this end, the conductor 30 may be connected with the movable contact element or blade 31 of the switch 22, said switch preferably comprising a 3-position switch wherein the blade may occupy a neutral or "off" position as shown. From the neutral position the blade may be moved in one direction to engage a contact 32 and in the opposite direction to engage a pair of contacts 132 and 33. The contacts 32 and 132 may be electrically connected together and with any utility such as a radio in order to energize the same when the switch is thrown in either one direction or the other from its said neutral or "off" position. The contact 33, however, may be electrically connected with the ignition means 15 to energize the same through a conductor 34 when the switch is thrown to its "on" position in engagement with said contact 33. The contact 33 may also be electrically connected to ground through a normally open switch 35, comprising a starter button, and a relay coil 36 operatively associated with the normally open switch 25 to cause the same to close whenever and so long as the coil 36 is energized by closure of the starting switch 35, when the switch 31 is in its "on" position, closure of the switch 25, of course, causing operation of the motor 11 for the cranking of the engine to be started.

As shown in Fig. 8, a switch 22' may be substituted for the switch 22 and the starter switch 35 in order to combine the functions of both switches in a single unit. To that end, the switch 22' comprises a 4-position switch having a blade 31' which may occupy a neutral or "off" position as shown. From the neutral position the blade may be moved in one direction to engage a contact 32' and in the opposite direction to engage a pair of contacts 132' and 33'. The contacts 32 and 132' may be electrically connected together and with any utility, such as a radio, for the operation of the same when the switch is thrown in either direction from its said neutral position. The switch blade 31', however, may be moved from its neutral position beyond the position in which it engages the contacts 33' and 132' into position engaging a contact 133' and a contact 35'. The contacts 33' and 133' are electrically interconnected and are connected with the ignition means 15 through the conductor 34, the contact 35' being electrically connected to ground through the solenoid 36 which operates the switch 25 for the operation of the starter motor 11.

The movable switch blade 31' may be normally biased, as by means of a spring, away from its position of engagement with the contacts 35' and 133' toward its position of engagement with the contacts 33' and 132'. Accordingly, when moved against its said bias into engagement with the contacts 35' and 133', and held in such position, not only will the ignition means be energized, through the contact 133', but the coil 36 will also be energized, through the contact 35', to operate the starter motor 11 through the closure of the switch 25. After the motor has started, however, release of the switch blade 31' will allow it to return, under the influence of its biasing spring, to a running position in engagement with the contacts 33' and 132', in which position the ignition means only will be electrically connected with the power source 14 and, hence, energize thereby, while the coil 36 will be disconnected from the power source, at the contact 35', to thus discontinue operation of the starting motor 11 through the movement of the switch 25 to its normally open position.

The above described equipment is, of course, conventional in automotive vehicles; and the present invention contemplates the application of the hereinafter described equipment for accomplishing automatic starting and stopping of the engine independently of the conventional control switch 22 or 22'. To this end, the invention provides means operable to start the engine, maintain it in operation, and stop the same in accordance with the conditions in response to which it may be desired automatically to thus start and stop the engine. Such means may comprise a control circuit 37 interconnected in parallel relationship with respect to the master control switch 22 or 22', said circuit embodying circuit control components for accomplishing the automatic starting, running and stopping of the engine in the manner desired. As shown, the circuit 37 may extend from the bus conductor 26 in series through suitable connection means 38, a thermally controlled switch 39 and normally closed, time delay opening switch means 40, to the ignition supply conductor 34 and to the starter conductor 36', preferably through the connection means 38.

The switch 39, as shown more especially in Fig. 12 of the drawings, may be of the sort having normally open contacts associated with thermally responsive means 81, including a temperature responsive element 82, operable to close the switch when the responsive element is exposed to a predetermined low temperature, and thereafter to maintain the switch in closed position until the responsive element reaches a predetermined high temperature, whereupon the responsive means becomes operable to open the switch and thereafter maintain the switch in open position until the responsive element is again exposed to the predetermined low temperature at which it is adjusted for switch closing purposes.

Such thermally responsive switches, in various forms, presently are readily available, and any such switch of suitable or preferred form may be employed in the system to control the starting and stopping of the engine. Such thermally responsive switches, furthermore, may embody manually operable means 83 adjustable at will to determine the high and low temperatures at which it may be desired to set the same for switch opening and closing operation.

For the purpose of diagramatically illustrating conventional thermally responsive switch actuating means 81, Fig. 12 shows a lever 84 mounted on a pivot 85 and positioned to close the switch 39 against its normal bias. The lever 84 is drivingly connected, as through a rod 86, with an arm 87 of an actuating lever rockably mounted on a support pivot 88. An over-centering or toggle spring 89 is connected with the actuating lever whereby to yieldingly urge it, in one direction, on its pivot against a switch closed stop 90, and, in the opposite direction, against a switch open stop 91, spaced from the stop 90. The actuating lever may have another arm 92 drivingly connected with the responsive element 82, preferably through the adjustable means 83.

To this end, the element 82 may comprise an expansible device having an attached bulb 82' and adapted to expand and contract longitudinally with increase and decrease in the temperature to which the bulb is exposed. The element 82 may be connected with a bar 93 to axially move the same as the member 82 expands and contracts. The bars 92 and 93 may be formed respectively with longitudinally extending slots 94 and 95 in which a driving pin 96 extends. The adjustable means 83 may comprise axially alined stems threadedly connected on the bar 93 at opposite ends of the slot 95, the mutually facing ends of the stems being formed for bearing engagement with the pin 96, whereby to adjust the temperature of the bulb 82' at which either stem comes into driving engagement with the pin 96.

The switch 39 may be mounted in any suitable or convenient position to expose its thermally responsive element 82 in heat exchange relationship with any desired portion of the engine, or of the atmosphere immediately surrounding the engine. It is preferable, however, to position the switch with its thermally responsive element in heat exchange relationship, either with the engine block itself, or with the circulating coolant employed to control engine temperature when the same is in operation. To that end, the switch 39, as shown in Fig. 12, may be mounted with its bulb element 82' in heat exchange relation with any convenient portion of the coolant circulating system of the engine, as for example the hose connection 97' between the radiator and the engine block of an internal combustion engine of the sort commonly employed for powering automotive vehicles. The switch 39 accordingly is adapted to close under predetermined or selected low temperature engine conditions, thereafter to remain closed until exposed to predetermined or selected high temperature engine conditions, then to open and thereafter to remain open until again exposed to the said predetermined or selected low temperature engine conditions.

The time delay means 40 may comprise switch means of the normally closed type adapted to open after an interval determined by the amount of electrical current flowing in the system. Consequently, said means 40 is adapted normally to condition the system for engine starting purposes and to disable the system after an engine starting attempt of predetermined duration has been completed, whether or not the engine has started in operation as the result of such starting attempt.

As shown in Figs. 1 and 13, the means 40 may comprise a switch 41 normally biased, as by means of a spring toward switch open position, and switch actuating means 42 comprising a switch closing cam 97, fusible metal 98 in a suitable container 99 and an actuating spring 100 for holding the switch 41 in closed position until the fusible metal becomes heated and changes to liquid form, as the result of current flow therethrough, the fusible material in liquid form allowing the cam 97 to move from switch closing position, under the influence of spring 100, to thereby release the switch 41 for opening movement under the influence of its biasing spring. The cam 97 may be secured fast on a carrying stem 101 having a preferably ribbed portion 102 turnably mounted within the container in position enveloped by the fusible material 98, so that when said material is in solid condition, the stem is secured to the container against turning movement therein. The stem 101, however, may turn freely in the container when the material 98 is in its liquid phase. The spring 100 may be attached to a radially extending arm 103 secured on the stem 101 whereby to yieldingly urge the stem in one direction about its axis. The fusible medium, after discontinuation of current flow therethrough, is adapted to solidify and thereby hold the switch 41 in closed position, after the same shall have been returned to such closed position, either manually, as by means of a push button or turnable knob, or automatically, as hereinafter described. Switches of the sort employing a fusible metal in such fashion are readily available, and have heretofore been employed as electrical overload protection devices. The present invention, however, contemplates the employment of switches of the character mentioned for time delay opening purposes rather than for overload protection. To this end, the switch 41 may be interconnected in the circuit 37 in series with the thermally responsive switch 39, and the fusible material 98 may be disposed in position to be heated as the result of and in proportion to current flow in the starter motor circuit. This may be accomplished by interconnecting the material 98 directly in the starter motor circuit conductor 24, between the control switch 25 and the starter motor 11, by means of suitable material contacting terminals mounted on the container 99; or the fusible material may be disposed in heat exchange relation with a heating coil 98' connected in the starter motor circuit.

Accordingly, upon closure of the thermally responsive switch 39, under temperature conditions requiring the engine to be automatically started, the switch 41 being also closed, the circuit 37 will be completed from the bus conductor 26 to the engine ignition system 15 and also through the connection means 38 to the conductor 36', thus operating the solenoid 36 to close the normally open switch 25 for the delivery of electrical power from the source 14, through the conductor 24, to the engine starting motor 11, through the closed switch 25 and the fusible means 98 of the time delay opening switch means 40. The motor 11, consequently, will be driven in an attempt to start the engine; and said starting attempt will be continued until the flow of motor energizing current through or in heat exchange relation with the fusible material 98 causes the same to melt, thus allowing the switch 41 to open and disable the circuit 37, thereby de-energizing the coil 36, and allowing the switch 25 to return to its normally open position, thus stopping the starting motor 11.

The time delay opening means 40 may be selected to continue the engine starting effort for a desired interval of, say, twenty-five seconds, normally sufficient to start an internal combustion engine that is in startable condition. If the engine does start during the interval of the starting effort, the function and purpose of the circuit 37 will have been accomplished. Should the engine fail to start during such interval, the time delay opening means 40 will assure the discontinuation of the starting effort, thereby preventing the unnecessary drainage of power from the source 14 in an effort to start an engine which is not in condition to be statred. A resetting button or knob 43 may, of course, be provided for manually reclosing the switch 41, after the fusible material 98 shall have become solidified after discontinuation of current flow threrethrough through opening of the switch means 40.

As shown more particularly in Fig. 13, the resetting knob or button 43 may be fastened to the container 99, which may also carry a ratchet wheel 104 secured thereto in position to latchingly engage with a spring pressed pawl or detent 105. Upon turning of the container 99 when the material 98 is solid, as by operation of the knob 43, the stem 101 may be turned in a direction to tension the spring 100 and to position the cam 97 to close the switch 41. The pawl and ratchet allow the container 99 to be so turned to switch closing position and thereafter operate to hold the parts in such position against the contrary urge of the spring 100. Upon fusion of the material 98, the stem 101 will be released for turning movement under the influence of the spring 100, whereby to displace the cam 97 sufficiently to allow the switch 41 to open, a stop being preferably provided for limiting switch opening movement of the cam under the influence of the spring.

As shown more particularly in Figs. 2, 15 and 16 of the drawings, the time delay opening switch means 40 may comprise a normally closed switch 41' of the bimetallic thermally responsive kind, in association with an electrical heater filament 42', the switch 41', and heater element 42' being preferably enclosed in a sealed envelope 44 as of glass. The switch 41' may be electrically connected in the circuit 37 in series with the thermally responsive switch 39 and in parallel relationship with respect to a normally open thermally responsive switch 45 of any suitable or preferred character. One side of the heater element 42' may be electrically interconnected with the circuit 37 between the switches 39 and 41'. Its other side may be connected to ground and hence with the grounded side of the power source 14. The switch 45 may be disposed in heat exchange relationship with any heat source activated by or in response to engine operation. To this end the switch 45 conveniently may comprise a bimetallic element 106 mounted in a housing 107 having an open side, whereby said element may be exposed to the heat of engine exhaust gases by mounting the housing 107 upon the engine exhaust manifold 108 in position exposing the bimetallic switch element to the heat emitted by said manifold through the open side of the housing. When so exposed to engine manifold heat, the switch 45 is adapted to close.

Upon closure of the thermally responsive switch 39 under temperature conditions requiring the engine to be automatically started, the switch 41' being in its normally closed condition, the circuit 37 will be completed from the bus conductor 26 to the engine ignition system 15 and also through the connection means 38 to the conductor 36', thus operating the solenoid 36 to close the normally open switch 25 for the delivery of electrical power from the source 14, through the conductor 24, to the engine starting motor 11, through the closed switch 25. The motor 11 consequently will be driven in an attempt to start the engine; and said starting attempt will be continued until the switch 41' opens in thermal response to heat generated by the heater 42', as the result of current flow therethrough from the power source 14 through the closed switch 39 and said heater to ground.

The thermal responsive characteristics of the switch 41' and of the heater 42' may be selected to continue the engine starting effort for a desired interval of, say, twenty-five seconds, normally sufficient to start an internal combustion engine that is in startable condition. If the engine does start during the interval of the starting effort, the normally open switch 45 will close as the result of the delivery of hot engine exhaust gases into the exhaust manifold of the engine. As a consequence, upon the opening of the switch 41', at the conclusion of the starting effort interval, the circuit 37 will be maintained to continue delivery of ignition power for the continued operation of the engine. Should the engine fail to start during the starting interval, the switch 45 will, of course, remain open, and the opening of the switch 41' will assure the discontinuation of the starting effort, by deenergizing the coil 36, thus allowing the switch 25 to open, and preventing the unnecessary drainage of power from the source 14 in an effort to start an engine which is not in condition to be started.

It will be seen, of course, that the heater element 42' will remain in operation so long as the switch 39 remains closed. As a consequence, said heater at the conclusion of an initial starting effort will maintain the switch 41' in open position so long as the switch 39 remains closed, regardless of whether the engine starts or fails to start. As hereinafter more fully disclosed, the present invention contemplates the provision of additional mechanism, if desired, to allow the starting effort to be repeated successively a predetermined number of times before the system becomes finally disabled, to afford every opportunity for starting the engine if the same is at all startable.

It is desirable to provide for breaking the circuit to the coil 36 as soon as the engine starts in operation, to thus discontinue operation of the starting motor 11, without, however, interrupting the connection of the circuit 37 with the ignition means. To this end, a normally closed switch 46 may be interposed in the conductor 36', preferably between the contact means 38 and the coil 36. A solenoid or coil 46' may be provided in association with the switch 46 to open the same when the coil 46' is energized. The coil 46' may be interconnected between the grounded and ungrounded sides of the generator 12 in order to apply power, developed by operation of the generator, to energize the coil to an extent sufficient to open the switch 46 and thereby to deenergize the coil 36, as soon as the engine, having been started, shall drive the generator for the delivery of energizing power to the coil 46'. It will be seen that a switch 46 and its operating coil 46' need not necessarily be included in the system shown in Figure 1, since the opening of the switch 41, in Figure 1, will serve to disable the starting motor. It is, however, desirable to include such a switch and its operating coil in the Figure 1 system for purposes hereinafter set forth.

Where the self-starting and stopping system of the present invention is applied to load driving engines, such as engines forming the power plant of automotive vehicles, it is desirable, if not essential, to provide means for preventing the operation of the system in the event that the engine is drivingly connected with its load. To this end, the circuit 37 may be provided with a switch 47 connected in series with the switch means 39 and 40 in said circuit and operatively associated with the transmission, or other means drivingly connecting the engine with its load, whereby the switch 47 will be closed only when the engine is drivingly disconnected from its load, such as the driving wheels of an automotive vehicle, and otherwise will be open. Where applied in automotive vehicles, the switch 47, as shown more particularly in Fig. 17, may conveniently comprise a conventional normally open switch enclosed in a suitable housing and mounted, as on a bracket 109 secured to the steering post of the vehicle, said switch being adapted to close and to remain in closed position when and so long as its actuating button 110 is depressed. The switch mechanism may include a switch actuating lever 111 having a cam following roller 112, said lever being mounted in position to depress the actuating button 110 in response to pressure applied on the lever at the roller 112. The switch may be mounted on the bracket 109 in fashion presenting the roller 112 in position to be engaged by an operating lug or lobe 113 mounted on a transmission controlling member 114 of the vehicle, said lug being positioned to engage and close the switch only when the vehicle transmission is in neutral position disconnecting the engine from the driving wheels of the vehicle.

In order to aid in starting the engine, during the starting interval provided by the time delay opening switch means 40, the system may include a solenoid or coil 48 interconnected in parallel with the coil 36 and hence adapted to be energized simultaneously therewith during the starting interval. The coil 48, when energized, is adapted to shift an associated armature element 48' which may be drivingly connected with the engine fuel supply means to desirably regulate fuel flow to the engine, during the starting interval, and hence provide optimum engine starting conditions in so far as fuel supply thereto is concerned.

It will be seen from the foregoing that the engine, having been started as aforesaid, as the result of closure of the thermally controlled switch 39, may continue in operation so long as such switch 39 remains closed, and that the engine will be stopped as soon as temperature conditions controlling the switch 39 reach a predetermined high value at which the switch 39 is adjusted to open. When the switch 39 opens, of course, the supply of energizing power to the engine ignition system will be cut off and, accordingly, the engine will cease to operate.

It will be seen also that the present system requires a circuit portion 37' in parallel relationship with respect to that portion of a conventional automotive starting circuit which includes the starting buttons 35 or 35'. Accordingly, such starter button circuit, as indicated in dotted lines in Figures 1, 4, 5 and 6, becomes superflous and may be eliminated in systems incorporating the present invention. Whether or not the starter button and its circuit be so eliminated, the engine may be started manually, at will, simply by throwing the blade 31 of the switch 22 into engagement with the contact 33; or by throwing the blade 31' of the switch 22' into engagement with the contact 33'. Thereupon, the starter motor 11 will be energized to perform its starting operation. After the engine shall have been started in such fashion, the switch 46 will operate, as previously described, to discontinue the operation of the starting motor.

Incorporation of the switch 46, in engine starting systems for automotive vehicles, provides for automatic engine restarting in novel fashion, in the event of stalling of the engine, while the system is operating under the control of its manually operable switch 22 or 22'. In that connection, the switch 46 affords means for automatically recranking the engine through the operation of the starting motor 11 in the event that the motor, for any reason, should stop as the result of a stall. Should the engine stall while propelling the vehicle, the generator 12, of course, will cease to rotate, thereby deenergizing the coil 46' and allowing the switch 46 to assume its normally closed position. Closure of switch 46, the switch 22 or 22' being in its "on" position, will energize the coil 36 to close the switch 25 and place the starting motor 11 in operation. If, at such time, the operator of the vehicle throws out the vehicle clutch, or otherwise disconnects the engine from the driving wheels of the vehicle, the engine will immediately be restarted in operation, through the cranking operation performed by the motor 11. When the engine is restarted in operation, in such automatic fashion, following a stall, the switch 46 will reopen as the coil 46' is energized by operation of the engine driven generator 12.

If it be desired to control the automatic starting and stopping of the engine at selected intervals of time, a switch 49, adapted to be controlled by the operation of clock mechanism 50, may be substituted for the thermostatically controlled switch 39; or, as shown in Figures 1 and 2, the clock controlled switch 49 may be interconnected in parallel relationship with the switch 39 so that the control system may be operated either in response to thermal conditions, or at clock controlled intervals. In addition to the switch 49, a switch 49' may be provided for control by the clock mechanism 50 in unison with the switch 49, said switch 49' being interconnected between the bus conductor 26, preferably through the connection means 38 and the circuit 28 of the fan motor 23, between said motor and the manual control switch 29. When the switches 49 and 49' are in closed position, as the result of the operation of the clock mechanism 50, the switch 49 will actuate the system to perform its engine starting operation, in exactly the same fashion as heretofore described in connection with operation of the system in response to closure of the switch 39. At the same time, closure of switch 49' may be arranged to cause operation of the fan motor 23, in order to circulate air, warmed as the result of the operation of the engine, through the passenger compartment of the vehicle in which the system is installed.

The clock mechanism 50 may be of any suitable or preferred type for the purpose of opening and closing the switch means 49 and 49' at desired intervals. In this connection, the clock mechanism may be of the ordinary time indicating sort usually provided in automotive vehicles as a part of the vehicle equipment. Such time indicating clock mechanism, however, may be provided with cam means, rotatable by the clock, in position periodically to close and thereafter open the switches 49 and 49'; and said cam means may be provided for adjustment in order to open and close the switches at selected times during the cyclic operation of the clock mechanism.

If desired, the clock mechanism 50, as shown in Fig. 18, may comprise a conventional timer device adapted to return suitable switch actuating cam means 115 to a zero or starting position, at a regulated rate of speed when displaced, manually or otherwise, from starting position, to thereby determine a desired time interval. As shown, the cam means 115 may comprise a plate mounted on a stem 116 and having a switch actuating lobe 117 in position to actuate the switch 49 when the cam means is in its zero position, which may conveniently be determined by the interengagement of cooperating stops 118 on the cam and on the frame on which the mechanism is mounted. The stem 116 is drivingly connected with the clock mechanism 50 and may be provided with a manually operable knob 119, by means of which the cam 115 may be shifted to retractingly displace the lobe 117 any desired distance from switch actuating position, to thereby set the timer device for operation, the clock mechanism, with which the stem 116 is drivingly connected, being simultaneously set in operation to return the cam to switch actuating position during a time interval determined by the displacement of the cam 115 in setting the mechanism for operation. Such clock mechanism may be operable to cause closure of the switch 49 only when its driven cam means is in its zero position, in order thus to provide for starting the engine at the conclusion of any desired time delay interval following the manual setting of the timer away from its zero position. With such an arrangement, of course, the engine, after starting, will remain in operation until the operator of the vehicle interrupts the circuit 37; and it, therefore, may be desirable to provide manually operable control switch means 51 in series with the switches 49 and 49', whereby the operation of the system under the control of the clock actuated switches may be disabled when the switch means 51 is in open position.

The switch means 51 may comprise independent switch elements whereby the switch 49 may be operatively connected in the automatic engine starting system, while the switch 49' may be connected with the fan motor or not, as desired; and, of course, both switches may be coupled together for simultaneous operation, if desired. Indeed, if desired, the switch 49' may be eliminated and the switch 49 used alone in series with a single control switch 51, for controlling the fan motor 23 as well as the automatic engine starting system, as shown more particularly in Figure 3 of the drawings. In such case, it may be desirable to provide a control switch 51', connected between the fan motor circuit 28 and the automatic starting circuit, on the side of the switch 51 remote from the switch 49, for the selective connection of the fan motor for control by the switch 49.

The automatic system is, of course, operable only when the control switch means 51 is closed. It will be seen that the switch 29 may be operated independently of the switch means 51 to enable the fan motor 23 to be energized independently of the switch 49'. Where only a thermally operated switch 39 is employed for automatic engine starting purposes, as shown in Figure 4, a switch, like the switch 51', may be interconnected between the fan motor circuit and the automatic engine starting circuit 28 in order to allow for the operation of the fan motor, under control of the switch 39, to warm the passenger space of the vehicle upon closure of the switch 39 for engine starting and operating purposes.

Where both a thermally responsive switch 39 and a clock controlled switch 49 are provided in the same system, it may be desirable to incorporate selector switch means 52, of the sort disclosed in Figure 10 of the drawings, in place of the switch means 29, 51 and 51', whereby the automatic engine starting system may be placed selectively under the control of the switch 39 or the switch 49, or both; and the fan motor 23 may be selectively placed under the control of the switch means 39 and 49. As shown, the selector switch means 52 may comprise a triple pole multiple position rotary switch. The poles, or movable elements of the switch, may be electrically connected respectively with the bus conductor 26, with the switch 49, and with the switch 39. The position contacts of the switch means 52 may be electrically connected in desired combinations, as in the manner shown, with the blower motor 23 and with the circuit 37, in order to allow for the selective connection of the blower motor 23 either directly with the bus conductor 26, or indirectly through one or the other, or both, of the switches 39 and 49, and to permit either or both of the switches 39 and 49 to be selectively interconnected in the automatic engine control circuit 37.

As shown in Figure 10, the initial position of the switch means 52 comprises an "off" position, in which the blower motor 23 is disconnected from the bus conductor 26 and the switches 39 and 49 are both disconnected from the blower circuit 28 and from the automatic engine starting circuit, which consequently is inoperative. The second switch position of the switch means 52 provides for connecting the blower motor 23 directly with the bus conductor 26, the switches 39 and 49 being both disconnected from the blower motor circuit 28 and the control circuit 37. In the third position of the switch means 52, the clock controlled switch 49 only is connected in the control circuit 37. In the fourth position, the clock controlled switch means 49 is connected in the control circuit 37, and is also connected to control the operation of the blower 23. In the fifth position, both switches 39 and 49 are interconnected in the control circuit 37, but the blower motor 23 is disconneced. In the sixth position, both switches 39 and 49 are connected in the control circuit 37 and the blower motor 23 is connected with the bus conductor 26 only through the switch 49. In the seventh position, both switches 39 and 49 are connected in the control circuit 37, and the blower motor 23 is connected with the bus conductor 26 only through the switch 39. In the eighth position, the switches 39 and 49 are both connected in the circuit 37, and the blower motor is connected with the bus conductor through both of the switches 39 and 49. In the ninth position, only the thermally responsive switch 39 is connected in the control circuit 37, and the blower motor 23 is connected with the bus conductor through said switch 39. In the tenth position, only the switch 39 is connected in the circuit 37, the blower motor 23 being entirely disconnected. The switch means 52 thus gives complete selective control of the blower and of the connection of the time and thermally controlled switches in the automatic engine starting and stopping system.

As shown in Figures 1 and 7, the automatic engine starting and stopping circuit 37 may be permanently connected in the conventional ignition and starting system of an engine to be controlled. If so connected, the equipment, unless provided with disconnecting switches, such as the switch means 51 or 52, will be at all times ready to perform its engine starting and stopping functions. This is not at all an undesirable feature. On the contrary, permanent electrical connection of the automatic control system is doubtless the least expensive manner of applying the invention to use. It is, however, entirely feasible and within the contemplation of the invention to constitute the connection means 38 as selector switch means in order to condition the system for operation only under the control of the automatic engine starting and stopping means, or entirely under the control of the manual switch means 22 or 22'.

As shown in Figure 7, the connection means 38 may comprise a double pole three position switch 53 connected in such fashion that, when in one position, the switch 53 will interconnect the automatic control circuit 37 only for operation, the conventional control switch 22 or 22' being disconnected and in operation. When the switch 53 is in its second position, only the conventional control switch 22 or 22', and the starter button 35, will be connected in the system for conventional operation, the automatic control circuit 37 being disconnected and inoperative to control the engine, and the relay switch 46, even though operative, being incapable of automatically starting the engine in the event that the same should stall. In the third position of the switch 53, the automatic control circuit 37 is disconnected and inoperative to control the engine, but the system is connected to operate in unconventional fashion to start in response to operation of the control switch 22 or 22', without recourse to the starter button 35 or 35'; and the relay switch 46 is also capable of operating to cause recranking of the engine in the event of a stall.

It is, of course, entirely feasible to omit the switch position in which the system is conditioned only for conventional operation under the control of the switch 22 or 22' and the starter button 35, since the starter button is entirely unnecessary and superfluous, in the system of the present invention.

As shown in Figure 9, however, an additional improvement may be provided to allow the solenoid switch 46, when the automatic engine control circuit 37 is connected for operation, to control the operation of the blower motor 23. Such facility makes possible the elimination of the switch means 51, 51', and so much of the switch means 52 as is concerned with the connection of the blower motor 23 with the switches 39 and 49. To this end, the connection means 38 may comprise a triple pole double throw switch 53', and the solenoid switch 46 may be provided with normally open switch contacts 146 adapted to be closed when the solenoid 46' becomes energized by the generator 12 as the result of engine operation. Two of the poles of the switch 53 are adapted, respectively, to condition the system either for automatic operation under the control of the circuit 37, or for operation under the control of the switch means 22 or 22'. The third pole of the switch, only when the same is positioned to connect the circuit 37 for the automatic start and stop control of the engine, serves to complete a circuit 29' in parallel relation with respect to the switch 29, between the bus conductor 26 and the blower motor 23. The switch 146 is connected in series in the circuit 29' so that, upon closure of the switch 146, whenever the engine is in operation under the control of the circuit 37, the blower motor 23 will be energized through the circuit 29'. This third pole of the switch 53', however, is arranged to interrupt the circuit 29' whenever the switch 53' is in position to place the operation of the engine under the control of the manual switch 22 or 22'. A manually operable disabling switch 146' may also be connected in the circuit 29' to prevent operation of the blower motor, by said circuit, if desired.

A pilot light 54 may be interconnected between the automatic control circuit 37 and ground, as shown in Figures 7 and 9, in order to provide an indication or warning that the automatic control circuit is connected for operation.

As shown more particularly in Figure 11 of the drawings, it may be desirable to provide a normally open relay switch 55 for energizing the coil 36 of the starter switch 25, such being desirable where the power required to operate the relay switch 36 is of such high order as to make it undesirable to carry such operating power in the control circuit 37. Accordingly, the solenoid 36 may be connected between ground and the conductor 24 through the switch 55, said switch having an operating coil 56 interconnected between the conductor 36' and ground. As a consequence, whenever the system demands operation of the starter motor 11, the coil 56 will be energized to close the switch 55, thus energizing the coil 36 to close the engine starting switch 25 by power drawn through the conductor 24 rather than through the circuit 37.

Experience shows that internal combustion engines of the sort employed for vehicle propulsion will normally start in operation in response to cranking effort continued over a period of the order of twenty-five seconds, providing, of course, that the engine is in startable condition. If an engine does not start as the result of cranking during a period of such order, such engine usually cannot be started merely by repeating the cranking operation. As a consequence, it is ordinarily entirely satisfactory to constitute the automatic starting system for the performance of but one starting effort in response to starting demand made effective by closure of a thermally responsive switch 39 or by closure of a clock controlled switch 49.

It is, however, within the purview of the present invention to provide automatic means for repeating the starting effort of the system a predetermined number of times, in the event that a preceding effort fails to start the engine in operation. To this end, as shown more particularly in Figures 5 and 6, the automatic repeater means may comprise a rotary switch 57 having an arm 58 driven by a pawl 59 and ratchet 59' actuated by a solenoid 60, said solenoid also operating a normally closed switch 61. Each time the solenoid 60 is energized, the switch 61 will open and the pawl and ratchet will be operated to advance the arm 58 from one circularly arranged contact element of the switch 57 to the next adjacent contact element thereof. Several of said contact elements 62 are entirely disconnected, while still other contact elements 64 are electrically interconnected together. The contact elements 63 and 64 are disposed intermediate the contact elements 62 of the interconnected contact groups, so that the arm 58 may progressively travel the contact elements of a group, then engage a contact element 64, followed by engagement with a disconnected contact element 63, after which the arm 58 will progressively travel the contact elements 62 of the next succeeding interconnected group of contact elements. The arm 58 of the rotary switch is electrically connected with the power source, as through the bus conductor 26. Accordingly, as the switch arm engages the contact elements of the switch, they also will be connected with the power source.

The repeater system, as shown in Figures 5 and 6, also includes a normally closed relay switch 65 interconnected in the circuit 37 on the side of the switch means 40 remote from the power source 14. The relay switch 65 includes an operating coil 65' adapted to open the switch when energized. The system may also include a double pole double throw press button resetting switch 66 normally biased toward a switch position in which switches 67 and 68 are closed, while switches 69 and 70 are open. One side of the solenoids 60 and 65' may be connected to ground. The ungrounded side of the solenoid 65' may be connected through the normally closed switch 67, with the interconnected contact elements 64 of the switch 57. The ungrounded side of the solenoid 60 may be interconnected through the normally closed switch 68 with the control circuit 37 on the side of the switch 65 remote from the power source 14. The normally open switches 69 and 70 may be connected in series between the interconnected contact elements 64 and the ungrounded side of the solenoid 60; and the normally closed switch 61 may be connected in series with the normally open switch 70 between the interconnected contact elements 62 of the rotary switch and the ungrounded side of the solenoid 60.

When the repeater mechanism is in starting position, the rotary switch arm 58 will be in engagement with one of the disconnected contact elements 63. If not in such position, the arm 58 may be placed in starting position by pressing the reset button of the switch 66, to close switches 69 and 70, and open switches 67 and 68. Thereupon, if the arm 58 be engaged with any of the contact elements 62, a circuit will be completed, from the power source 14 to ground, through arm 58, contact 62, switches 61 and 70, and the solenoid 60, thereby energizing the solenoid to move the ratchet and pawl to advance the arm to the next adjacent contact element. As soon as the solenoid 60 is so energized, however, the switch 61 will open to deenergize the solenoid, the pawl will be retracted, and the switch 61 will reclose. Should the arm 58 then be in engagement with another of the elements 62, the solenoid 60 will immediately operate again to advance the arm 58 to a next adjacent contact element. This action will be rapidly repeated, so long as the reset switch 66 is depressed, until the arm 58 engages a contact element 64, at which time the solenoid 60 will be energized by a circuit, from the power source 14 to ground, through the blade 58, contact 64, switches 69 and 70 and the solenoid 60, to move the blade 58 into engagement with the disconnected element 63 where the blade will come to rest in starting position, even if the reset switch continues to be depressed.

When the switch 57 is in starting position, application of electrical energy in the circuit 37, during the initial engine starting attempt, will energize the solenoid 60, from said circuit, through the closed switch 68, to advance the arm from engagement with the element 63 into position engaging the next adjacent contact of the rotary switch. Upon the opening of the switch means 40 at the conclusion of the starting effort, the solenoid 60 will, of course, be deenergized, and the pawl retracted on the ratchet. Means, hereinafter more fully described, may be provided for reclosing the switch means 40 after a suitable interval following termination of a starting effort. Upon reclosure of the switch means 40, a successive engine starting attempt will be made, and the solenoid 60, energized through the switch as previously described, will advance the arm 58 to the next adjacent contact element of the rotary switch. Starting attempts will thus be repeated at successive intervals until the arm 58 moves into engagement with a rotary switch contact 64, when a circuit will be completed from the power source 14 to ground through arm 58, contact 64, switch 67 and coil 65', thereby energizing the coil to open the switch 64 and disable the automatic engine starting system, and prevent further attempts at engine starting, until the switch is reset to its starting position by operation of the reset switch as heretofore described.

After the switch 65 opens, as aforesaid, to disable the automatic starting system, the blade 58 will remain in engagement with the contact 64, and the coil 65' will consequently remain energized and will hold the switch open until the reset switch 66 is operated to advance the arm 58 into engagement with the next adjacent element 63, of the rotary switch. If the engine should start as the result of the initial attempt, or any successive attempt, the arm 58 will remain in contact with the contact element 62 into engagement with which it was moved as the result of the successful starting attempt. After a successful starting attempt, the solenoid 60 may remain energized so long as the engine remains in operation, and will become deenergized when the engine is stopped. This, however, will not shift the arm 58. It is desirable, therefore, to provide pilot lamps 71 and 72, the former in parallel connection with the coil 65' and the latter connected between the interconnected contacts 62 and ground, whereby said lamps will give a visual indication that the relay switch is other than in its initial or starting position and that consequently the reset button should be pressed.

As shown in Figs. 5 and 15, the means for allowing the switch 41' to reclose, following an unsuccessful engine starting attempt, consists merely in connecting the heater element 42' between ground and the circuit 37 at a connection point therein on the side of the switch 41' remote from the power source 14. As a consequence, as soon as the switch 41' opens through exposure to heat generated by the operation of the heater 42', the heater will be disconnected from the power source and will cool off, thereby allowing the switch 41' to reclose for a repeat engine starting attempt.

As shown in Figs. 6 and 14, the means for reclosing the switch means 41, following an unsuccessful engine starting attempt, comprises a normally open relay switch 73 adapted to close when its operating coil 73' is energized, under the time delayed switch closing action of a dashpot 74, or other suitable switch closing delay means. The switch 41 may be provided with additional switching means forming a switch 75 that is open when switch 41 is closed and vice versa, so that the switch 75 closes when switch 41 opens at the conclusion of an engine starting attempt. The coil 73' may be connected between the conductor 24 and ground through the switch means 75. Consequently, the coil 73' will be energized to close the switch 73 when the switch 41 opens in response to the melting of the fusible material 98. The switch 73 is connected between ground and the conductor 24, in series with a coil 76 operatively associated with the switch means 41 and 75, to close the former and open the latter when the coil 76 is energized by closure of switch 73. The time delay means, of course, should be adapted to allow sufficient time to elapse between the closure of switch means 75 and the closure of switch 73 to allow the fusible material 98 to become solidified. In this connection, it should be understood that the coil 76 merely serves to turn the container 99, after the material 98 has become solidified, in order to reclose the switch 41. To this end, the coil 76 may be connected with a radially extending arm 43' which, like the manual reset knob 43, may be fastened to the container 99. If desired, of course, a manual reset knob 43 as well as a solenoid driven reset arm 43' may be secured to the container 99.

It will be seen that, when an engine, controlled by a system as shown in Figure 6, goes into operation, the circuit 37, since it carries energy, will energize the solenoid 60, so long as the engine remains in operation. The same situation will prevail in the system shown in Figure 5, wherein the heater element 42' will also be energized along with the solenoid 60, so long as the engine is in operation. This situation will prevail when the engine is in operation under control of the automatic control circuit, as well as when it is operating under control of the manual switch 22, or 22'. To prevent the unnecessary consumption of electrical power by the solenoid 60, in Figure 6, or by the solenoid 60 and heater 42' in Figure 5, a normally closed switch 77 may be connected in the conductor which connects said elements to ground. This switch 77, as shown more especially in Figure 6, may be operated in unison with the switch 46 by the coil 46'. Accordingly, the switch 77 will be and remain closed so long as the engine is not in operation, thereby operatively connecting the solenoid 60, in Figure 6, or the solenoid 60 and heater element 42', in Figure 5, to ground, and allowing the repeater equipment to function as intended and described. As soon as the engine starts in operation, however, and the repeater equipment is no longer required to operate, the switch 77 will open, in response to the energizing of coil 46' by the generator 12, and will break the ground connection of the repeater circuit elements. This arrangement will, of course, prevent the resetting of the repeater mechanism by operation of the button switch 66 only when the controlled engine is running.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein being preferred embodiments for the purpose of illustrating the invention.

We claim:

1. In a control system for an engine having electrical engine starter means, a starter circuit for energizing said starter means, an automatic control circuit for actuating said starter means by controlling the delivery of electrical power thereto through the starter circuit from a power source, said starter circuit including a normally open starter switch, said control circuit including, in series connection therein, a principal normally open control switch, a normally closed switch, a coil for closing said starter switch, automatic switch operating means for closing said principal control switch during automatic engine operating intervals, and actuating means electrically connected in one of said circuits and operable in response to current flow therein for opening said normally closed switch to thus discontinue operation of the starter means by opening said starter circuit after the starter means has continued in operation during an operating interval of predetermined duratiaon, as measured in terms of current flow in the circuit in which said actuating means is connected.

2. In a control system for an engine having electrical engine starter means, a starter circuit for energizing said starter means, an automatic control circuit for actuating said starter means by controlling the delivery of electrical power thereto through the starter circuit from a power source, said starter circuit including a normally open starter switch, said control circuit including, in series connection therein, a principal normally open control switch, a safety switch closed when the engine is drivingly disconnected from its load and otherwise open, a normally closed switch, a coil for closing said starter switch, automatic switch operating means for closing said principal control switch during automatic engine operating intervals, and actuating means electrically connected in one of said circuits and operable in response to current flow therein for opening said normally closed switch to thus discontinue operation of the starter means by opening said starter circuit after the starter means has continued in operation during an operating interval of predetermined duration, as measured in terms of current flow in the circuit in which said actuating means is connected.

3. In a control system for an engine having electrical engine starter means and power transmission means selectively operable to connect the engine with and to disconnect the same from its load, an automatic engine control circuit for actuating said starter means by delivery of electrical power thereto from a power source, said circuit including, in series connection therein, a principal normally open control switch, a safety switch controlled by said selectively operable means to close the safety switch when the engine is drivingly disconnected from its load and otherwise to open the safety switch, and a normally closed switch, automatic switch operating means for closing said principal control switch during predetermined engine operating intervals, and actuating means operable in response to current flow in said actuating means, following initiation of the operation of the starter motor, to open said normally closed switch to discontinue operation of the starter means by opening said circuit after the starter means has been energized during an operating interval of predetermined duration, as measured in terms of aggregate current flow in the circuit in which said actuating means is connected.

4. In a control system for an engine having electrical engine starter means comprising a motor, electrical circuit means including a relay switch and manually operable switch means for operating the relay switch to connect the motor with an electrical power source whereby to drive the same in an engine starting attempt, and power transmission means operable selectively to connect the engine with and to disconnect the same from its load, the combination with said circuit means of an automatic engine operating circuit portion connected with said electrical circuit means, in parallel relationship with said manually operable switch means, whereby to provide for operating said relay switch to actuate the motor when said manually operable switch means is open, said circuit portion including, in series connection therein, a principal normally open control switch, a safety switch actuated by said power transmission means to be closed when the engine is disconnected from its load, and otherwise to be open, and a normally closed switch, automatic switch operating means for closing said control switch during predetermined engine operating intervals, actuating means operable in response to current flow in said actuating means, following initiation of the operation of the starter motor, to open said normally closed switch to discontinue operation of the starter motor by opening said circuit portion after a motor operating interval of predetermined duration, as measured in terms of aggregate current flow in the circuit in which said actuating means is connected.

5. In a control system for an engine having electrical engine starter means, an automatic engine control circuit for actuating said starter means by delivery of electrical power thereto from a power source, said circuit including, in series connection therein, a principal normally open control switch and a normally closed switch, automatic switch operating means for closing said principal control switch during predetermined engine operating intervals, means operable to open said normally closed switch to discontinue operation of the starter means by opening said circuit after the starter means has been energized during an operating interval of predetermined duration, means, operable as a consequence of the opening of said normally closed switch, to reclose the same, after an elapsed time interval, to again operate the starter means, and repeater means comprising a rotary switch having a number of angularly spaced circuit-controlling contacts, means to energize said rotary switch from said circuit under the control of said delayed opening switch to cause the rotary switch to successively engage its said circuit-controlling contacts, in response to repeated motor operation, and a normally closed circuit disabling switch and means to disable said circuit when said rotary switch reaches a position engaging a predetermined one of its contacts.

6. In a control system for an engine having electrical engine starter means, an automatic engine control circuit for actuating said starter means by delivery of electrical power thereto from a power source, said circuit including, in series connection therein, a principal normally open control switch and a normally closed switch, automatic switch operating means for closing said principal control switch during predetermined engine operating intervals, means operable to open said normally closed switch to discontinue operation of the starter means by opening said circuit after the starter means has been energized during an operating interval of predetermined duration, means, operable as a consequence of the opening of said normally closed switch, to reclose the same, after an elapsed time interval, to again operate the starter means, a normally closed circuit-disabling switch connected in said circuit, repeater means connected with said circuit and progressively operable from an initial or starting position toward a switch actuating position, in response to repeated operation of the circuit for the actuation of the starter means, said repeater means being operatively connected with said circuit-disabling switch to open the same when the repeater means reaches its switch actuating position, and means operable to reset the repeater means to its starting position when displaced therefrom.

7. In a control system for an engine having electrical engine starter means, an automatic engine control circuit for actuating said starter means by delivery of electrical power thereto from a power source, said circuit including, in series connection therein, a principal normally open control switch and a normally closed switch, automatic switch operating means for closing said principal control switch during predetermined engine operating intervals, means operable to open said normally closed switch to discontinue operation of the starter means by opening said circuit after the starter means has been energized during an operating interval of predetermined duration, means, operable as a consequence of the opening of said normally closed switch, to reclose the same, after an elapsed time interval, to again operate the starter means, a normally closed circuit-disabling switch connected in said circuit, and repeater means connected with said circuit and progressively operable from an initial or starting position toward a switch actuating position, in response to repeated operation of the circuit for the actuation of the starter means, said repeater means being operatively connected with said circuit-disabling switch to open the same when the repeater means reaches its switch actuating position, and means operable to reset the repeater means to its starting position when displaced therefrom, including pilot lamp means connected with said repeater means to indicate displacement thereof from starting position.

8. In a control system for an engine having electrical engine starter means, an automatic engine control circuit for actuating said starter means by delivery of electrical power thereto from a power source, said circuit including, in series connection therein, a principal normally open control switch and a normally closed switch, automatic switch operating means for closing said principal control switch during predetermined engine operating intervals, and actuating means operable to open said normally closed switch to discontinue operation of the starter means by opening said circuit, at said normally closed switch, after the starter means has been energized during an operating interval of predetermined duration, said actuating means comprising biasing means urging said normally closed switch toward open position, and holding means for retaining the switch closed until released, said holding means comprising fusible material, and means exposing the material to fusing heat in quantity corresponding with the amount of energizing power delivered to the starting means when said control circuit is in operation, said automatic switch operating means comprising thermally responsive switch actuating means for closing the principal control switch in response to a predetermined engine temperature, for holding the same closed until, and for opening the same when, engine temperature reaches a predetermined higher value.

9. In a control system for an engine having electrical engine starter means, an automatic engine control circuit for actuating said starter means by delivery of electrical power thereto from a power source, said circuit including, in series connection therein, a principal normally open control switch and a normally closed switch, automatic switch operating means for closing said principal control switch during predetermined engine operating intervals, and actuating means operable to open said normally closed switch to discontinue operation of the starter means by opening said circuit, at said normally closed switch, after the starter means has been energized during an operating interval of predetermined duration, said actuating means comprising biasing means urging said normally closed switch toward open position, and holding means for retaining the switch closed until released, said holding means comprising fusible material, and means exposing the material to fusing heat in quantity corresponding with the amount of energizing power delivered to the starting means when said control circuit is in operation, said automatic switch operating means comprising clock controlled switch-actuating means for closing the principal control switch, at a time or times determined by said clock.

10. In a control system for an engine having electrical engine starter means, an automatic engine control circuit for actuating said starter means by delivery of electrical power thereto from a power source, said circuit including, in series connection therein, a principal normally open control switch and a normally closed switch, automatic switch operating means for closing said principal control switch during predetermined engine operating intervals, and means operable to open said normally closed switch to discontinue operation of the starter means by opening said circuit after the starter means has been energized during an operating interval of predetermined duration, said automatic switch operating means comprising clock controlled switch-actuating means for closing the principal control switch, at a time or times determined by said clock, and an additional normally open control switch connected in said circuit portion in parallel with said principal control switch, thermally responsive switch actuating means for closing the principal control switch in response to a predetermined engine temperature, for holding the same closed until, and for opening the same when, engine temperature reaches a predetermined higher value.

11. In a control system for an engine having electrical engine starter means, an automatic engine control circuit for actuating said starter means by delivery of electrical power thereto from a power source, said circuit including, in series connection therein, a principal normally open control switch and a normally closed switch, automatic switch operating means for closing said principal control switch during predetermined engine operating intervals, means operable to open said normally closed switch to discontinue operation of the starter means by opening said circuit after the starter means has been energized during an operating interval of predetermined duration, an auxiliary circuit for energizing a blower motor, and means for connecting the auxiliary circuit for operation in parallel with said normally closed switch, under the control of said normally open principal control switch.

12. In a control system for an engine having electrical engine starter means, an automatic engine control circuit for actuating said starter means by delivery of electrical power thereto from a power source, said circuit including, in series connection therein, a principal normally open control switch and a normally closed switch, automatic switch operating means for closing said principal control switch during predetermined engine operating intervals, means operable to open said normally closed switch to discontinue operation of the starter means by opening said circuit after the starter means has been energized during an operating interval of predetermined duration, an auxiliary circuit for energizing a blower motor, and manually operable switch means for selectively connecting the auxiliary circuit for operation in parallel with said normally closed switch, under the control of said normally open principal control switch, and for operation independently of said principal control switch.

13. In a control system for an engine having electrical engine starter means, an automatic engine control circuit for actuating said starter means by delivery of electrical power thereto from a power source, said circuit including, in series connection therein, a principal normally open control switch and a normally closed switch, automatic switch operating means for closing said principal control switch during predetermined engine operating intervals, and means operable to open said normally closed switch to discontinue operation of the starter means by opening said circuit after the starter means has been energized during an operating interval of predetermined duration, said automatic switch operating means comprising clock controlled switch-actuating means for closing the principal control switch, at a time or times determined by said clock, and an additional normally open control switch connected in said circuit portion in parallel with said principal control switch, thermally responsive switch actuating means for closing the principal control switch in response to a predetermined engine temperature, for holding the same closed until, and for opening the same when, engine temperature reaches a predetermined higher value, and selector switch means for disconnecting at least one of said control switches from said circuit.

14. In a control system for an engine having electrical engine starter means, an automatic engine control circuit for actuating said starter means by delivery of electrical power thereto from a power source, said circuit including, in series connection therein, a principal normally open control switch and a normally closed switch, automatic switch operating means for closing said principal control switch during predetermined engine operating intervals, and means operable to open said normally closed switch to discontinue operation of the starter means by opening said circuit after the starter means has been energized during an operating interval of predetermined duration, said automatic switch operating means comprising clock controlled switch-actuating means for closing the principal control switch, at a time or times determined by said clock, and an additional normally open control switch connected in said circuit portion in parallel with said principal control switch, thermally responsive switch actuating means for closing the principal control switch in response to a predetermined engine temperature, for holding the same closed until, and for opening the same when, engine temperature reaches a predetermined higher value, an auxiliary circuit for energizing a blower motor, and selector switch means for connecting either or both of said control switches in said circuit and for connecting said auxiliary circuit for operation in parallel relation with said normally closed switch under control of either or both of said control switches.

15. In a control system for an engine having electrical engine starter means and an engine driven generator, an automatic engine control circuit for actuating said starter means by delivery of electrical power thereto from a power source, said circuit including, in series connection therein, a principal normally open control switch and a normally closed switch, automatic switch operating means for closing said control switch during predetermined engine operating intervals, and actuating means operable to open said normally closed switch to discontinue operation of the starter means by opening said circuit, at said normally closed switch, after the starter means has been energized during an operating interval of predetermined duration, said actuating means comprising biasing means urging said normally closed switch toward open position, and holding means for retaining the switch closed until released, said holding means comprising fusible material, and means exposing the material to fusing heat in quantity corresponding with the amount of energizing power delivered to the starting means when said control circuit is in operation, a normally open relay switch having an operating coil connected in said circuit, said switch being connected to electrically energize said starter means, and a normally closed circuit disabling switch connected in said circuit and having an operating coil energized by said engine driven generator.

16. In a control system for an engine having electrical engine starter means, an electrical engine-driven generator, and a control circuit including a normally closed overload switch, the operating coil of a normally open relay switch and a control switch adapted to be closed to energize said coil from an electrical power source to thereby close the relay switch for the connection of the starter means with a source of energizing power, the combination with said control circuit of a normally closed disabling switch in series therein, said disabling switch having an operating solenoid connected with said generator to open said disabling switch and thereby discontinue operation of the starter means when the engine is in operation and driving said generator, biasing means urging said normally closed switch toward open position, holding means for securing the switch in closed position, against the influence of said biasing means, said holding means comprising fusible material in solidified condition, and means exposing said material to fusing heat in quantity corresponding with the amount of energizing power supplied to said starting means when said circuit is in operation.

17. In a control system for an engine having electrical engine starter means, an automatic engine control circuit for actuating said starter means by delivery of electrical power thereto from a power source, said circuit including, in series connection therein, a principal normally open control switch and a normally closed switch, automatic switch operating means for closing said principal control switch during predetermined engine operating intervals, means operable to open said normally closed switch to discontinue operation of the starter means by opening said circuit after the starter means has been energized during an operating interval of predetermined duration, comprising biasing means urging said normally closed switch toward open position, and holding means for securing the switch in normally closed position, against the influence of said biasing means, said holding means comprising fusible material in solidified condition and exposed to fusing heat in quantity corresponding with the amount of energizing power supplied to said starting means when said circuit is in operation.

18. In a control system for an engine having electrical engine starter means, an automatic engine control circuit for actuating said starter means by delivery of electrical power thereto from a power source, said circuit including, in series connection therein, a principal normally open control switch and a normally closed heat responsive switch, automatic switch operating means for closing said principal control switch during predetermined engine operating intervals, and means operable to open said normally closed switch to discontinue operation of the starter means by opening said circuit after the starter means has been energized during an operating interval of predetermined duration, comprising a heater element disposed in position to heat said normally closed heat responsive switch to cause the same to open, said heater element being connected in said circuit in parallel with the normally closed switch, under the control of said principal control switch, and a normally open thermal switch connected in parallel with said normally closed switch and disposed in heat exchange relation with the engine to close and thereby maintain said circuit when the engine is in operation after the opening of said normally closed switch.

19. In a control system for an engine having an electric engine starting motor, a circuit for delivering electric power to operate said motor, including a closed control switch in said circuit during automatic engine operating periods, and means for opening the switch, after the same has remained closed, during operation of said motor, for a period measured in terms of operating energy delivered to the starter motor, during said period, comprising a switch operating member, fusible means for holding the member in projected switch closed position, biasing means normally urging said member away from such projected position, and means for applying fusing heat to said material in proportion to the quantity of power delivered through said circuit to said motor.

References Cited in the file of this patent

UNITED STATES PATENTS

| Number | Name | Date |
| --- | --- | --- |
| Re. 23,340 | Lincoln | Feb. 13, 1951 |
| 1,269,637 | Olmsted | June 18, 1918 |
| 1,293,569 | Stein | Feb. 4, 1919 |
| 1,386,844 | Cowen | Aug. 9, 1921 |
| 1,771,866 | Stevenson et al. | July 29, 1930 |
| 1,930,200 | Harrison | Oct. 10, 1933 |
| 1,981,859 | Frese | Nov. 27, 1934 |
| 2,197,726 | Johnson | Apr. 16, 1940 |
| 2,374,251 | Wallace | Apr. 24, 1945 |
| 2,550,414 | Haines | Apr. 24, 1951 |
| 2,579,958 | Perhats | Dec. 25, 1951 |
| 2,606,298 | Merritt | Aug. 5, 1952 |